United States Patent [19]

Jackson

[11] Patent Number: 4,829,141
[45] Date of Patent: May 9, 1989

[54] EPOXY FUSION CATALYST AND PROCESS

[75] Inventor: Roy J. Jackson, Houston, Tex.

[73] Assignee: Shell Oil Company, Houston, Tex.

[21] Appl. No.: 80,134

[22] Filed: Jul. 31, 1987

[51] Int. Cl.$^4$ .................... C08G 59/68; C08G 59/06
[52] U.S. Cl. .................................. 528/89; 528/365; 528/374; 252/182.27
[58] Field of Search ................... 528/89, 365, 374

[56] References Cited

U.S. PATENT DOCUMENTS

| | | | |
|---|---|---|---|
| 3,477,990 | 11/1969 | Dante et al. | 260/47 |
| 3,547,885 | 12/1970 | Dante et al. | 269/47 |
| 3,738,862 | 6/1973 | Klarquist et al. | 528/89 X |
| 3,824,212 | 7/1974 | Sinnema et al. | 260/47 EP |
| 3,843,605 | 10/1974 | Schmidt et al. | 260/47 EP |
| 3,948,855 | 4/1976 | Perry | 528/89 |
| 3,978,027 | 8/1976 | Marshall | 260/47 EP |
| 4,320,222 | 3/1982 | Lopez | 528/89 |
| 4,352,918 | 10/1983 | Whiteside et al. | 528/89 |
| 4,354,015 | 10/1982 | Doorakian et al. | 528/89 |
| 4,366,295 | 12/1982 | Tyler et al. | 525/482 |
| 4,370,465 | 1/1983 | Whiteside et al. | 528/104 |
| 4,405,766 | 9/1983 | Bertram et al. | 528/89 X |
| 4,410,596 | 10/1983 | Whiteside et al. | 428/413 |
| 4,438,254 | 3/1984 | Doorakian et al. | 528/89 |
| 4,496,709 | 1/1985 | Doorakian et al. | 528/89 |
| 4,544,731 | 10/1985 | Cavitt et al. | 528/89 |
| 4,632,971 | 12/1986 | Cavitt | 528/89 X |
| 4,634,757 | 1/1987 | Marshall | 528/89 |

OTHER PUBLICATIONS

Tolman, Phosphorus, Ligand Exchange Equilibria on Zerovalent Nickel. A Dominant Role for Steric Effects, J. Am. Chem. Soc. 92, pp. 2956-2965 (1970).

*Primary Examiner*—Earl Nielsen

[57] ABSTRACT

A process is disclosed for preparing an advanced epoxy resin by reacting a relatively low molecular weight polyepoxide with a phenol, thiophenol, carboxylic acid or carboxylic acid anhydride in the presence of a catalytic amount of an alkyl substituted phosphonium salt such as tributyl phosphonium bromide. The process can be carried out under reaction conditions, such as the presence of water, which are deleterious to certain epoxy advancement catalysts.

11 Claims, No Drawings

EPOXY FUSION CATALYST AND PROCESS

BACKGROUND OF THE INVENTION

This invention relates to the preparation of epoxy resins. In one aspect, the invention relates to a catalyzed process for reacting a hydroxyl group-containing compound with an epoxy-containing compound. In a further aspect, the invention relates to a catalyst for use in an epoxy fusion process.

Epoxy compounds are well known and include many compounds of varying molecular weight and epoxy equivalent weight. To simplify the production of a large number of epoxy compounds that vary mainly in molecular weight, it is common practice to manufacture a single epoxy compound of relatively low molecular weight and react the epoxy compound with a compound containing phenolic hydroxyl groups in the presence of a catalyst so as to obtain phenolic hydroxy ether compounds of desired higher molecular weight. The conventional catalysts employed are inorganic bases or tertiary amines, which are also effective catalysts for competing reactions of epoxides with alcoholic hydroxyl groups, homopolymerization of epoxy groups and the like. As a result, the product obtained is a mixture of polymers and resins with varying degrees of molecular weight, chain branching and end group functionality. More recent catalysts with improved selectivity include phosphonium halides as disclosed in U.S. Pat. Nos. 3,477,990 and 4,438,254.

When many of these high-selectivity catalysts are mixed with the epoxy resins to produce a "pre-catalyzed" epoxy composition, the storage stability of the composition at elevated temperatures is not acceptable for many applications because of the reduced activity of the stored resin. U.S. Pat. No. 4,320,222 discloses the use of a precatalyzed polyepoxide containing a phosphonium halide catalyst and an alkali metal halide or hydroxide stabilizer additive as one approach to this problem.

An alternate approach is to control the reaction process steps under strict conditions so as not to deactivate the catalyst. For example, U.S. Pat. No. 4,438,254 describes the use of phosphonium salt catalysts which are water-sensitive and recommends careful control of water and temperature in the reaction mixture.

Given the storage instability of precatalyzed epoxy resin systems, it would be desirable to develop precatalyzed epoxy resin systems which have good storage stability at high temperatures and high activity in the presence of water.

SUMMARY OF THE INVENTION

According to the invention, an advanced epoxy resin is prepared by reacting a compound containing at least one vic-epoxy group with a hydroxyl group-containing compound in the presence of a catalyst selected from the group consisting of salts of the formula

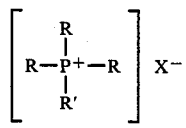

in which each R is selected from hydrogen or $C_4$–$C_{10}$ hydrocarbyl, and at least 2 R groups are $C_4$–$C_{10}$ alkyl; R' is $C_1$–$C_6$ alkyl; and X is a compatible anion. R and R' can contain substituents which are not inconsistent with catalytic effectiveness.

In a preferred embodiment, the catalyst is a tri-t-butyl substituted phosphonium halide. The catalyst has good thermal stability, storage stability, and resistance to deactivation by water.

In a further embodiment, the invention relates to a pre-catalyzed epoxy resin composition comprising a polyepoxide and a catalytic amount of a catalyst of the above formula.

DETAILED DESCRIPTION OF THE INVENTION

The process of the invention involves the reaction of an epoxy compound and a hydroxyl group-containing compound in the presence of a described phosphonium salt catalyst to form the desired phenolic hydroxy ether of the partial formula

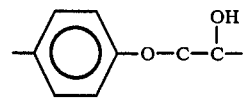

The polyepoxides employed in the present invention include those compounds possessing more than one vicinyl epoxy group per molecule, i.e., more than one

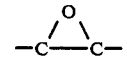

group per molecule. These polyepoxides are saturated or unsaturated, aliphatic, cycloaliphatic, aromatic or heterocyclic, and are substituted, if desired, with non-interfering substituents, such as halogen atoms, hydroxy groups, ether radicals, and the like. Preferred liquid polyepoxides include the liquid glycidyl polyethers of polyhydric phenols and polyhydric alcohols. More preferred are the glycidyl polyethers of 2,2-bis(4-hydroxyphenyl)propane having an average molecular weight between about 340 and about 900 and an epoxide equivalent weight of between about 170 and about 500. Especially preferred are the glycidyl polyethers of 2,2-bis(4-hydroxyphenyl)propane having an average molecular weight of between about 340 and about 900, an epoxide equivalent weight of between about 170 and about 500, and containing from about 0.01% to about 1.0% weight or higher of saponifiable chlorine. As used herein the terms "epoxide equivalent weight" and "weight per epoxide" refer to the average molecular weight of the polyepoxide molecule divided by the average number of oxirane groups present in the molecule.

The low molecular weight epoxide is reacted with a hydroxyl groupcontaining compound such as a phenol, thiophenol or carboxylic acid. The preferred hydroxyl group-containing compounds are phenols having at least one hydroxyl group attached to an aromatic nucleus. The phenols can be monohydric or polyhydric and can be substituted or unsubstituted. Examples of suitable phenols include phenol, resorcinol, o-cresol, m-cresol, p-cresol, chlorophenol, nitrophenol, hydroquinone, 2,2-bis(4-hydroxyphenyl)propane, 2,2-bis(4-hydroxyphenyl)pentane, and the like, and polymeric polyhydric phenols obtained by condensing monohydric or polyhydric phenols with formaldehyde.

Preferred phenols are the polyhydric phenols containing from 2 to 6 OH groups and up to 30 carbon atoms, including those represented by the formula

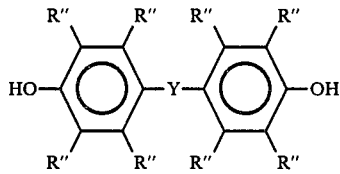

wherein Y is a polyvalent radical and each R″ is independently selected from hydrogen, halogen and hydrocarbon radicals. The preferred radicals represented by Y are oxygen, sulfur, —SO—, —SO$_2$—, divalent hydrocarbon radicals containing up to 10 carbon atoms and oxygen, silicon, sulfur or nitrogen containing hydrocarbon radicals. The preferred phenol is 2,2-bis(4-hydrodxyphenyl)propane (bisphenol-A), in which each R″ is H and Y is isopropylidene.

The polyepoxide may be reacted with a carboxylic acid and/or carboxylic acid anhydride in place of or in addition to the phenol. The carboxylic acids used may be saturated, unsaturated, aliphatic, cycloaliphatic, aromatic or heterocyclic. Examples of such acids include, among others, succinic acid, glutaric acid, adipic acid, pimelic acid, suberic acid, azelaic acid, sebacic acid, oxalic acid, abietic acid, maleic acid, aconitic acid, chlorendic acid and phthalic acid.

The epoxy resin fusion catalysts of the invention process can be describe by the formula

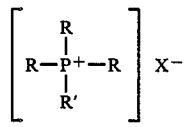

in which each R is selected from hydrogen and substituted or unsubstituted C$_4$-C$_{10}$ alkyl including cycloalkyl; R′ is C$_1$-C$_6$ alkyl or cycloalkyl; at least 2 R groups are C$_4$-C$_{10}$ alkyl including cycloalkyl; and X is a compatible anion. In the preferred catalyst, each R is C$_4$-C$_{10}$ alkyl. R can be, for example, butyl, pentyl, hexyl, heptyl, octyl, nonyl, deayl and cyclohexyl. The preferred R groups, because of the demonstrated catalytic effect of the phosphonium salts and the availability of the precursors for preparation of the phosphonium salts, are tert-butyl and cyclohexyl.

The compatible anion X can be selected from a wide range of chemical species. Preferred anions are halides, preferably bromide, chloride or iodide; carboxylates, such as formate, acetate, oxalate or trifluoroacetate; conjugate bases of weak inorganic acids, such as bicarbonate, fluoride or dihydrogen phosphate and conjugate bases of a phenol, such as phenate or an anion derived from bisphenol A. The most preferred anions are halides, with bromide being the most preferred halide.

The invention catalyst can be prepared by adding dropwise, with stirring, one mole of alkyl halide, such as iodomethane, to one mole of alkyl phosphine, such as di- or tri-tertiarylbutyl phosphine, at room temperature. The reaction is allowed to continue with stirring for about an hour after completion of the addition of the alkyl halide. The precipitated product is collected, washed with a suitable solvent such as cyclohexane, and dried. Structures can be confirmed by phosphorous NMR.

The fusion reaction is generally carried out by combining the polyepoxide and fusion compound reactants at a starting temperature of about 100°–120° C. and allowing the reaction to exotherm to a temperature of about 160°–200° C., for a time of about 1–2 hours. The relative amount of the reactants depends upon the characteristics, particularly the molecular weight, of the product desired. For the preferred high molecular weight phenolic hydroxy ether resin products having an epoxide equivalent weight of between about 500 and about 7,000, about 0.4 to 1 mole bisphenol-A will be reacted with each mole of a diglycidyl ether of bisphenol-A having an epoxide equivalent weight of between about 170 and about 500.

The amount of the catalyst employed in an epoxy fusion reaction can vary widely. In general, the amount of catalyst will fall within the range of about 0.001% to about 5% by weight of the total reactants, more preferably from about 0.002% to about 2%, and most preferably from about 0.03% to about 0.1% by weight of the reactants.

The fusion reaction is carried out in the presence or absence of solvents or diluents. In most cases, the reactants are liquid and the reaction is easily carried out without the addition of solvents or diluents. However, where either or both reactants are solids or viscous liquids it may be desirable to add diluents. Examples of such materials include inert hydrocarbons such as xylene, toluene, cyclohexane and the like.

If solvents are employed in the reaction and the resulting product is to be used for coating purposes, the solvent is typically retained in the reaction mixture. Otherwise, the solvent is removed by any suitable method such as by distillation or the like.

The fusion reaction can be carried out in the presence or absence of water, depending on the fusion product desired. Satisfactory product will generally be obtained even when 0.01 weight percent or more water is present in the reaction mixture. An amount of water of 0.3 to 1.0 weight percent is not unusual in the starting polyepoxide, and the reaction is most conveniently carried out without removal of this water.

When the fusion reaction has proceeded to an advanced epoxy resin fusion product having the desired WPE, generally about 500 or greater, deactivation of the catalyst is conveniently carried out by adding, with stirring, the desired amount of an acid or sulfonium salt of an acid containing an anion of low nucleophilicity (HBF$_4$, CF$_3$SO$_3$H, HPF$_6$ and HS$_6$F$_6$, for example) to the fusion reaction mixture. The temperature at which deactivation is carried out is not critical, and will generally occur at the temperature of the fusion reaction mixture at the desired point of termination of the fusion reaction, which will generally be about 180° C. Following deactivation of the catalyst, the advanced epoxy resin is recovered and processed by conventional methods.

It will often be advantageous not to deactivate the catalyst, but rather to maintain the phosphonium catalyst in the recovered fusion product in an active state. This enables the use of the residual live phosphonium catalyst to catalyze subsequent chemical processes which employ the fusion product as a starting material. For example, the high molecular weight fusion product containing live catalyst can be esterified with a dimer acid, without additional resin. The use of advanced epoxy resins made employing catalysts which are essentially deactivated during the advancement reaction requires either the addition of an esterification catalyst or a base, such as sodium carbonate, to prevent gelation before a satisfactory low acid number is achieved in the esterified epoxy resin.

The invention pre-catalyzed composition has long shelf life and good stability in the presence of water. The high molecular weight fusion product is obtained with minimum branching and is useful for solvent-borne coating, powder coatings, or electrical laminating.

EXAMPLE 1

The storage stability of a resin containing methyl tri-t-butyl phosphonium iodide was examined. Methyl tri-t-butyl phosphonium iodide was prepared by charging 4.04 g tri-t-butyl phosphine to a 25-ml reaction flask and adding iodomethane dropwise at room temperature. A vigorous reaction produced a white precipitate, which was washed with cyclohexane and dried.

100 g EPON ® Resin 828, a liquid epoxy resin having a WPE of about 185, was charged to a 250 ml flask. The resin was heated to 50° C., and sufficient tri-t-butyl phosphonium iodide was added with stirring to produce a precatalyzed resin having 0.24 meq catalyst per 100 g resin. Ten-gram samples were used for stability tests on the precatalyzed resin. 3 g of BPA were added to preheated samples of the resins stored at 200° F. for the times listed in Table 1 below. The reaction mixture was heated in a 160° C. oven for 45 min and was then cooled. The aging effect on the precatalyzed resin can be seen from a comparison of the actual WPE of the fusion product with its theoretical WPE.

TABLE 1

| Days aged | WPE aged resin | Theo WPE | Actual WPE |
|---|---|---|---|
| 0 | 185 | 469 | 485 |
| 10 | 189 | 486 | 513 |
| 17 | 194 | 515 | 540 |
| 24 | 198 | 537 | 568 |

Table 1 shows that the precatalyzed, aged resin containing methyl tri-butylphosphonium iodide was active up to 24 days under the aging conditions.

EXAMPLE 2

Tests were done to determine the stability of the above precatalyzed resin containing methyl tri-t-butyl phosphonium iodide catalyst in the presence of water. Two samples of a precatalyzed resin each having a WPE of about 185 and containing 0.24 meq/100 g catalyst were reacted with BPA to prepare fusion products having WPE's of about 467 (theoretical 470). The reaction mixture for Run 1 had no added water, and that for Run 2 had 4.8 meq added water. Following completion of the first fusion reaction for each run, sufficient additional BPA was added to each reaction mixture to produce a fusion product having a theoretical WPE of about 1700. The reaction mixtures were allowed to reach a holding temperature of about 173° C. and were held for about 1 hour, then the solid fusion product of each run was recovered for determination of WPE. The final WPE of the first fusion product of Run 1 was 1643, and that for the fusion product obtained from Run 2 was 1645. The catalyst was thus active for both stages of the advancement reaction, even in the presence of added water.

EXAMPLE 3

This example shows the storage stability of precatalyzed resin containing methyl tricyclohexyl phosphonium iodide catalyst. Tricyclohexyl phosphonium iodide was prepared by reacting tricyclohexylphosphine with iodomethane. 3.95 g of tricyclohexyl phosphine was charged to a 200-ml flask. 70 ml of cyclohexane was added. The resulting solution was maintained with stirring under a nitrogen blanket and condenser. 2 g of iodomethane was added to the solution, resulting in the precipitation of a white solid. The reaction mixture was vacuum filtered and dried in a vacuum oven.

100 g of EPON ® Resin 828, a liquid epoxy resin having a WPE of about 185, was charged to a 200 ml reaction flask and heated to 50° C. Sufficient tricyclohexyl phosphonium iodide was added to prepare a precatalyzed resin having 0.24 meq catalyst per 100 g resin. Ten-gram samples were used for stability tests of the precatalyzed resin. Three grams of BPA were added to preheated samples of the resins stored at 200° F. as shown below in Table 2. Precatalyzed, aged resin was employed in a fusion reaction which prepared an epoxy resin having the indicated WPE. The aging effect on the precatalyzed resin can be seen from a comparison of the actual WPE of the fusion product with its theoretical WPE.

TABLE 2

| Days aged | WPE aged resin | Theo WPE | Actual WPE |
|---|---|---|---|
| 0 | 184 | 468 | 489 |
| 1 | 191 | 499 | 490 |
| 4 | 192 | 498 | 504 |
| 7 | 191 | 499 | 507 |
| 11 | 194 | 515 | 498 |
| 21 | 198 | 539 | 537 |

The data of Table 2 demonstrate that the precatalyzed, aged resin containing methyl tricyclohexyl phosphonium iodide was active up to 21 days under the aging conditions.

I claim:

1. A process for preparing an advanced epoxy resin from a reaction mixture containing at least about 0.01 weight percent water, the process comprising:

contacting in said reaction mixture a polyepoxide having an average of more than 1 vicinal epoxide group per molecule and a weight per epoxide less than about 500 with a fusion compound selected from the group consisting of phenols, thiophenols, carboxylic acids and carboxylic acid anhydrides in the presence of a catalytic amount of a catalyst of the formula

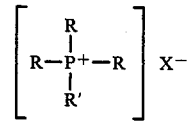

in which each R is selected independently from the group consisting of substituted or unsubstituted tert-butyl and cyclohexyl; R' is substituted or unsubstituted $C_1$-$C_8$ alkyl; and X is a compatible anion, at a temperature in the range of about 100° C. to about 200° C. for a time sufficient to produce an advanced epoxy resin having a weight per epoxide of at least about 500.

2. The process of claim 1 in which each R is tert-butyl.

3. The process of claim 1 in which X is halide.

4. The process of claim 1 in which the catalyst is a tri-t-butyl phosphonium halide.

5. The process of claim 4 is which the halide is bromide.

6. The process of claim 4 in which the catalyst is present in an amount within the range of about 0.001 to about 5.0 weight percent, based on the weight of the polyepoxide.

7. The process of claim 4 in which the polyepoxide is a diglycidyl ether of 2,2-bis(4-hydroxyphenyl) propane.

8. The process of claim 1 in which the advanced epoxy resin has a molecular weight of from about 500 to about 7000.

9. The process of claim 1 in which each R is cyclohexyl.

10. The process of claim 1 in which the catalyst is a methyl tri-t-butyl phosphonium halide.

11. The process of claim 1 in which the reaction mixture contains water in an amount within the range of about 0.3 to about 1.0 weight percent.

* * * * *